United States Patent
Subramanian et al.

(10) Patent No.: US 9,606,221 B2
(45) Date of Patent: Mar. 28, 2017

(54) CIRCUIT ARRANGEMENT FOR A FRONT END OF AN FMCW RADAR TRANSCEIVER, FMCW RADAR TRANSCEIVER AND METHOD FOR OPERATION

(71) Applicant: Technische Universitaet Berlin, Berlin (DE)

(72) Inventors: Viswanathan Subramanian, Berlin (DE); Tao Zhang, Berlin (DE); Georg Boeck, Berlin (DE)

( * ) Notice: Subject to any disclaimer, the term of this patent is extended or adjusted under 35 U.S.C. 154(b) by 287 days.

(21) Appl. No.: 14/349,702

(22) PCT Filed: Oct. 5, 2012

(86) PCT No.: PCT/DE2012/100315
§ 371 (c)(1),
(2) Date: Apr. 4, 2014

(87) PCT Pub. No.: WO2013/050032
PCT Pub. Date: Apr. 11, 2013

(65) Prior Publication Data
US 2014/0292562 A1    Oct. 2, 2014

(30) Foreign Application Priority Data

Oct. 6, 2011   (DE) .................. 10 2011 054 242

(51) Int. Cl.
*G01S 7/35*    (2006.01)
*G01S 7/03*    (2006.01)
(Continued)

(52) U.S. Cl.
CPC ............... *G01S 7/35* (2013.01); *G01S 7/032* (2013.01); *G01S 7/034* (2013.01); *G01S 7/352* (2013.01);
(Continued)

(58) Field of Classification Search
CPC ... G01S 7/02; G01S 7/03; G01S 7/032; G01S 7/034; G01S 7/35; G01S 7/352;
(Continued)

(56) References Cited

U.S. PATENT DOCUMENTS 5,053,722 A * 10/1991 Kuo .......................... G01S 7/03
                                                            331/2
5,274,380 A * 12/1993 Yatsuka .................... G01S 7/35
                                                            342/100

(Continued)

FOREIGN PATENT DOCUMENTS

DE      60 305 674 T2    5/2007

OTHER PUBLICATIONS

McGregor, et al., Switching System for Single Antenna Operation of an S-Band FMCW Radar, IEE Proc.-Radar, Sonar Navigation, Aug. 1994, pp. 241-248, vol. 141, No. 4, New Zealand.

(Continued)

*Primary Examiner* — Bernarr Gregory
(74) *Attorney, Agent, or Firm* — Dinsmore & Shohl LLP

(57) ABSTRACT

A circuit arrangement for a front end of an FMCW radar transceiver, with a signal terminal that is configured so as to couple to a signal filter device for purposes of signal exchange, a further signal terminal that is configured so as to couple to a VCO device for purposes of signal exchange, and an electronic circuit, which with the aid of a switching device included in the electronic circuit can be switched over between a reception circuit configuration and a transmission circuit configuration, is disclosed. The switching device has an RF switch, with which a signal route formed respectively in the RF switch, is embodied asymmetrically, in that the signal route in a reception circuit configuration and the signal route in a transmission circuit configuration have a different number of switching stages. A FMCW radar (Continued)

transceiver, and a method for the operation of a front end are also disclosed.

18 Claims, 4 Drawing Sheets

(51) Int. Cl.
  *G01S 13/02* (2006.01)
  *G01S 13/34* (2006.01)
  *G01S 13/93* (2006.01)
(52) U.S. Cl.
  CPC .............. *G01S 13/02* (2013.01); *G01S 13/34* (2013.01); *G01S 13/931* (2013.01)
(58) Field of Classification Search
  CPC .......... G01S 13/02; G01S 13/06; G01S 13/08; G01S 13/32; G01S 13/34; G01S 13/88; G01S 13/93; G01S 13/931; G01S 13/10; G01S 13/24
  See application file for complete search history.

(56) References Cited

U.S. PATENT DOCUMENTS

| | | | | |
|---|---|---|---|---|
| 5,517,197 A | * | 5/1996 | Algeo | ..................... G01S 7/032 342/130 |
| 6,720,912 B2 | | 4/2004 | Shono | |
| 6,972,711 B2 | | 12/2005 | Shono | |
| 7,138,939 B2 | * | 11/2006 | Honda | ..................... G01S 13/24 342/128 |
| 7,714,772 B2 | | 5/2010 | Shono | |

OTHER PUBLICATIONS

Saito, et al., AN FM-CW Radar Module With Front-End Switching Heterodyne Receiver, IEEE MT-S Digest, 1992, pp. 713-716, Japan.

* cited by examiner

CIRCUIT ARRANGEMENT FOR A FRONT END OF AN FMCW RADAR TRANSCEIVER, FMCW RADAR TRANSCEIVER AND METHOD FOR OPERATION

The invention concerns a circuit arrangement for a front end of an FMCW radar transceiver, an FMCW radar transceiver, and a method for its operation.

BACKGROUND

By virtue of the lesser requirements for transmission power, lower hardware complexity and greater robustness, frequency modulated continuous wave (FMCW) radar systems often come into consideration as a compact embodiment as an integrated circuit for the front end of the radar system. Such systems are deployed in large numbers, both in the automotive industry and also in telecommunications.

One form of embodiment concerns the FMCW radar system with a single antenna with timing control. When in operation radar systems with single antennae of known art use a time-wise distribution between transmission and reception modes of operation. An FMCW system of known art ((McGregor et al., Switching system for single antenna operation of an S-band FMCW radar, Proc. Inst. Elect. Eng.—Radar, Sonar Navig., 1994, Vol. 141, No. 4, Pages 241-248) uses a commercially available PIN diode as a switching element, which provides a high level of isolation between the transmitter and receiver. Another FMCW radar module of known art (Saito et al., An FM-CW Radar Module With Frontend Switching Heterodyne Receiver, International Microwave Symposium Digest (MTT-S), 1-5 Jun. 1992, Vol. 2, 1 Jun. 1992, Pages 713-716) is based on a superheterodyne receiver.

The documents (U.S. Pat. No. 6,720,912, U.S. Pat. No. 6,972,711, U.S. Pat. No. 7,714,772) are concerned with a single antenna implementation of the superhet front end based on use of the switching element. A transmission/reception switch on the antenna is used so as to be able to use the single antenna for both transmission and reception modes of operation.

The document U.S. Pat. No. 6,720,912 proposes the use of an additional transmission amplifier stage and reception amplifier stage downstream of the transmission/reception switch and to operate this synchronously. This increases the level of isolation between transmitter and receiver.

The document U.S. Pat. No. 6,972,711 is concerned with the utilisation of an additional switching and control network to switch the intermediate frequency (IF) and also the low-frequency oscillator signals, which are provided on a second mixer.

The document U.S. Pat. No. 7,714,772 discloses an extension of the concept in the document U.S. Pat. No. 6,720,912; this envisages additional amplification control blocks for the amplifier stages.

The document DE 60 305 674 T2 concerns a near-field pulse compression radar system.

SUMMARY

The object of the invention is to specify improved technologies for an FMCW radar transceiver, with which, in particular, an improved level of isolation is achieved between transmitter and receiver when in operation.

In accordance with the invention this object is achieved by means of a circuit arrangement for a front end of an FMCW radar transceiver in accordance with an independent claim, an FMCW radar transceiver in accordance with an independent claim, and a method for the operation of the front end in accordance with an independent claim. Advantageous configurations of the invention are the subjects of dependent subsidiary claims.

The inventive technologies provide for an asymmetric level of isolation of the circuit configurations during transmission and reception. In this respect transmitter and receiver are then asymmetrically isolated. This asymmetry is formed in that in the switching network of the RF switch a signal path formed in the transmission circuit configuration on the one hand, and a signal path formed in the reception circuit configuration on the other hand, feature a different number of switching stages.

In use the signal filter device linked with the front end circuit arrangement is located downstream of an antenna device, via which transmission signals can be delivered and reception signals can be received.

A preferred development of the invention envisages that the switching stages are embodied as single-stage and/or multi-stage switching stages.

An advantageous form of embodiment of the invention envisages that the switching unit has a DC switch; this is activated so as to form the reception signal route and the transmission signal route.

A further development of the invention preferably envisages that the RF switch and the DC switch are coupled such that both switches switch in a time-wise synchronous manner during a switchover between the reception circuit configuration and the transmission circuit configuration.

An arrangement of the invention envisages that the signal filter device is formed using a band-pass filter.

In an expedient arrangement of the invention provision can be made that in the transmission circuit configuration the signal route formed in the RF switch includes a transmission signal route and is formed as part of a signal path from the further connection to an amplifier device, and in the reception circuit configuration is formed as part of a signal path from the further connection to a mixer device, which is arranged in a reception signal route. The signal path formed in the transmission circuit configuration in the RF switch is preferably connected directly with a driver amplifier formed in the amplifier device, so that the signals provided by the VCO unit are coupled into the latter. In the reception circuit configuration the signal path formed in the RF switch is preferably connected with a mixer arranged in the signal route of the received signal (reception signal route), so that the signals provided from the VCO device can be utilised in the mixer to process the received signal.

In conjunction with the further developments of the method for the operation of the front end the embodiments made previously in connection with related arrangements of the circuit arrangement apply correspondingly.

BRIEF DESCRIPTION OF THE DRAWINGS

In what follows the invention is explained further on the basis of preferred examples of embodiment with reference to the figures of a drawing. Here.

DETAILED DESCRIPTION

Figure 1:
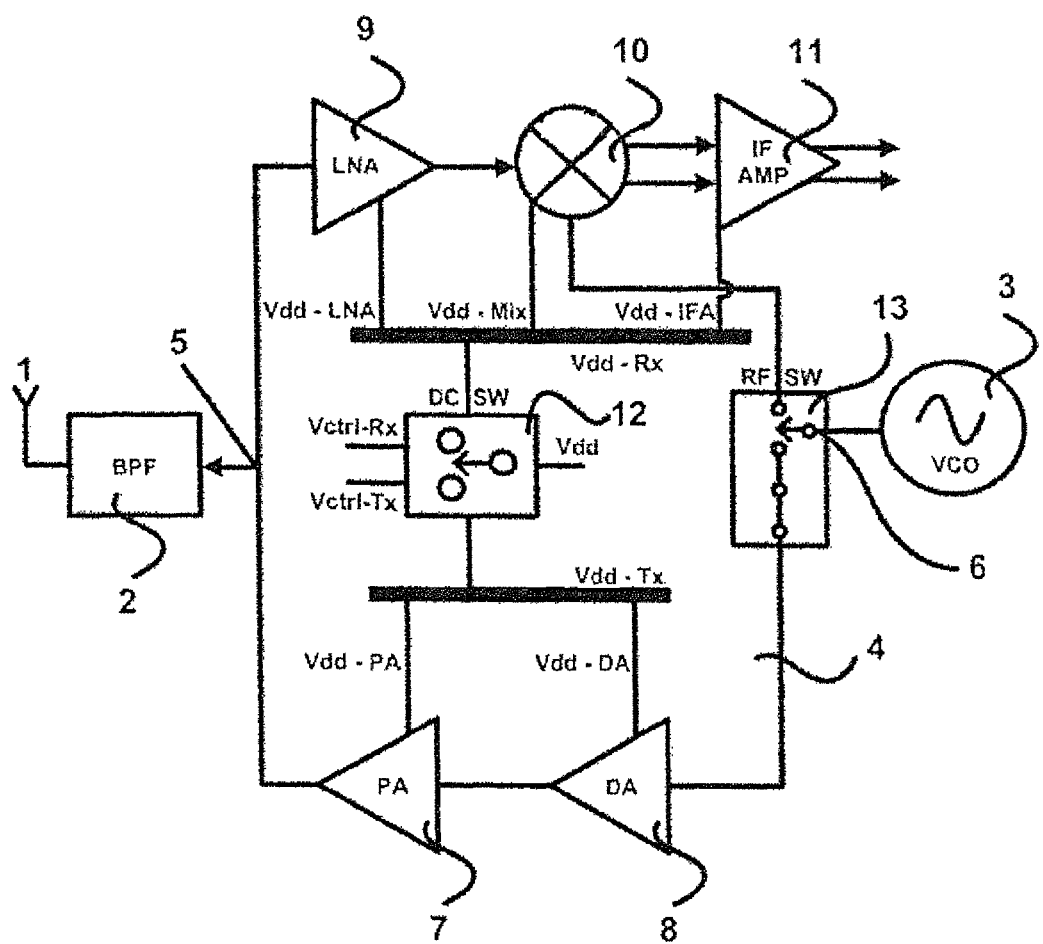
FIG. 1 shows a schematic representation of an FMCW radar transceiver in a single antenna embodiment.

FIG. 1 shows a schematic representation with a block diagram of an FMCW radar transceiver (FMCW=frequency modulated continuous wave) with an antenna 1, a band-pass filter 2 that is connected to it (BPF=band-pass filter), and a voltage-controlled oscillator 3 (VCO=voltage-controlled oscillator). Between the band-pass filter 2 and the voltage-controlled oscillator 3 is formed a circuit arrangement 4, which is connected via a signal terminal 5 for purposes of signal exchange with the band-pass filter 2, and via a further terminal 6 for purposes of signal exchange with the voltage-controlled oscillator 3. With the circuit arrangement 4 is formed a front end for the FMCW radar transceiver in a single antenna embodiment. The FMCW radar transceiver can be operated in a transmission mode of operation for purposes of sending signals via the antenna 1. In a reception mode of operation signals can be received via the antenna 1. The switchover between the modes of operation that are operating at separate times takes place with the aid of the circuit arrangement 4.

The antenna 1 is part of an RF system (RF=radio frequency), which is utilised for the transmission and reception of RF transmission and reception signals. The band-pass filter 2 is used to filter out signals located outside the signal band that is specified in each case, during both transmission and reception. The voltage-controlled oscillator 3 serves to generate the required high-frequency signals at a desired output power level for the transmission and reception conditions.

The front end thus formed of the high-frequency FMCW radar transceiver includes a transmitter and a receiver subsystem, which are utilised in the respective modes of operation for purposes of signal manipulation. A power amplifier 7 (PA=power amplifier) and a driver amplifier 8 (DA=driver amplifier) are parts of the transmitter subsystem. The power amplifier 7 delivers the necessary output power level to the band-pass filter 2. The driver amplifier 8 improves the overall amplification of the transmitter, compensates for losses along the transmission signal route, and drives the power amplifier 7 at the output power level for maximum efficiency.

A low-noise amplifier 9 (LNA=low-noise amplifier), a mixer 10 (mixer) as well as an intermediate-frequency amplifier 11 (IFA=intermediate-frequency amplifier) are parts of the receiver subsystem of the front end thus formed. During reception the high-frequency signals received are amplified by means of the amplifier 9 with minimal noise addition, and by means of the mixer 10 are converted to the lower frequency IF. The intermediate-frequency amplifier 11 amplifies the IF signals of the mixer 10 and improves the signal quality for further signal processing.

A DC switch 12 (DC SW=DC switch) and an RF switch 13 (RF SW=RF switch) operate in both the transmission mode of operation and also the reception mode of operation, and are used for purposes of switching between the modes of operation.

The terminals Vctrl-Tx and Vctrl-Rx are external transmission and reception control terminals. Vdd indicates in FIG. 1 the common external voltage supply to the front end. Vctrl-Tx or Vctrl-Rx are switched in or out as a function of the mode of operation, which internally switches in or out the voltage supply Vdd-Rx (and consequently Vdd-LNA, Vdd-Mix, and Vdd-IFA) of the receiver circuit, or Vdd-Tx (and consequently Vdd-DA, Vdd-PA) of the transmission circuit. This is executed with the aid of the DC switch 12, which takes the form of a switching network. The DC switch 12 is synchronised with the RF switch 13, which is embodied as an asymmetric switching network.

Figure 2:
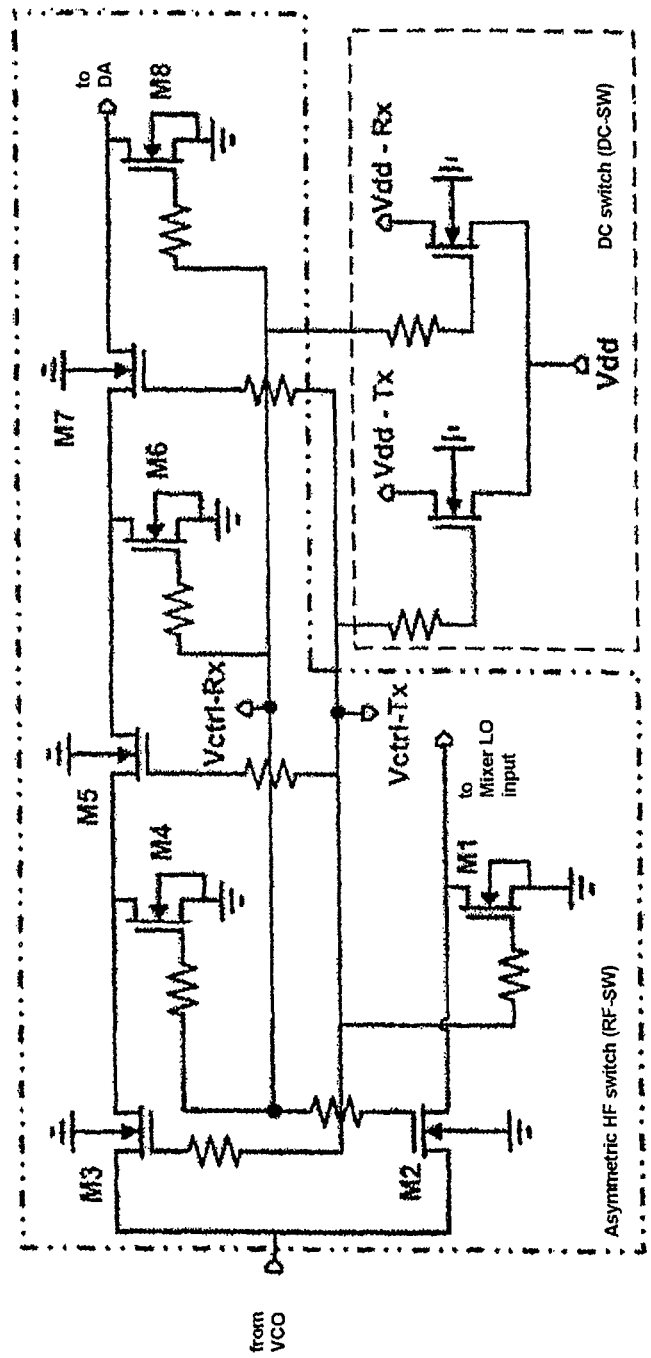
FIG. 2 shows a schematic representation of a switching network with an RF switch in an asymmetric embodiment, and also a DC switch.

FIG. 2 shows schematically the synchronisation between the DC switch 12 and the RF switch 13. In FIG. 2 M1 and M2 together indicate a single-stage switching stage. In a comparable manner M3/M4, M5/M6 and M7/M8 form in each case a single-stage switching stage in the RF switch 13. Depending upon whether the transmission or the reception circuit configuration is assumed by the RF switch 13, a different number of these switching stages are located in the signal path that is formed in the RF switch 13 itself. In the transmission circuit configuration the RF switch 13 is connected with the driver amplifier 8, and in the reception circuit configuration with the mixer 10. In the two circuit configurations the signal path formed in the switching network of the RF switch 13 in each case includes a different number of switching stages; this corresponds to an asymmetric design of the signal paths.

Because DC block capacitors along the RF signal route are deemed to be part of the tuning network of independent transceiver circuits, they are not shown in the RF switch 13 in FIG. 2.

The RF switch 13, embodied as an asymmetric switching network, switches the introduction of the signals from the voltage-controlled oscillator 3 into the transmission signal route and the reception signal route by means of two different modes of isolation, which in this respect are asymmetric. In accordance with FIG. 2 a single stage of the switching network is formed by means of the elements M1 and M2 along the signal path that is formed in the reception circuit configuration in the RF switch 13. In contrast the signal path that is formed in the RF switch 13 in the transmission circuit configuration is formed with three cascaded switching stages of the switching network, which include the elements M3 to M8. The differing number of switching stages along the signal path in the RF switch 13 for transmission and reception lead both to an asymmetric, that is to say, a different mode of isolation, and also to differing (asymmetric) loss values for the signals of the voltage-controlled oscillator 3 at the oscillator inputs for transmitter/receiver.

Figure 3:
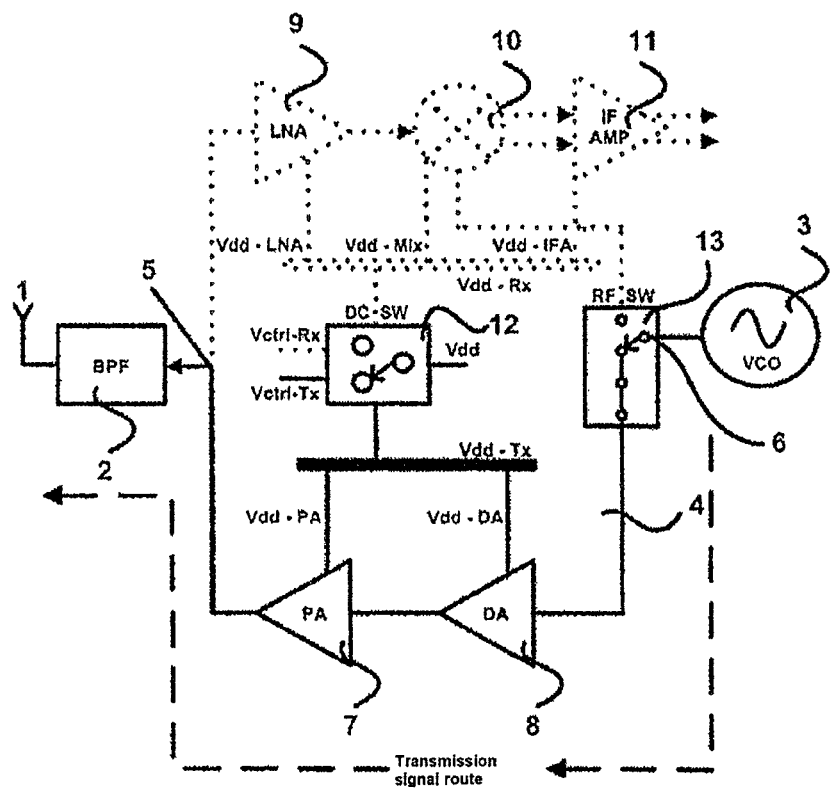
FIG. 3 shows a schematic representation of the FMCW radar transceiver from FIG. 1 for the transmission mode of operation.
Figure 4:
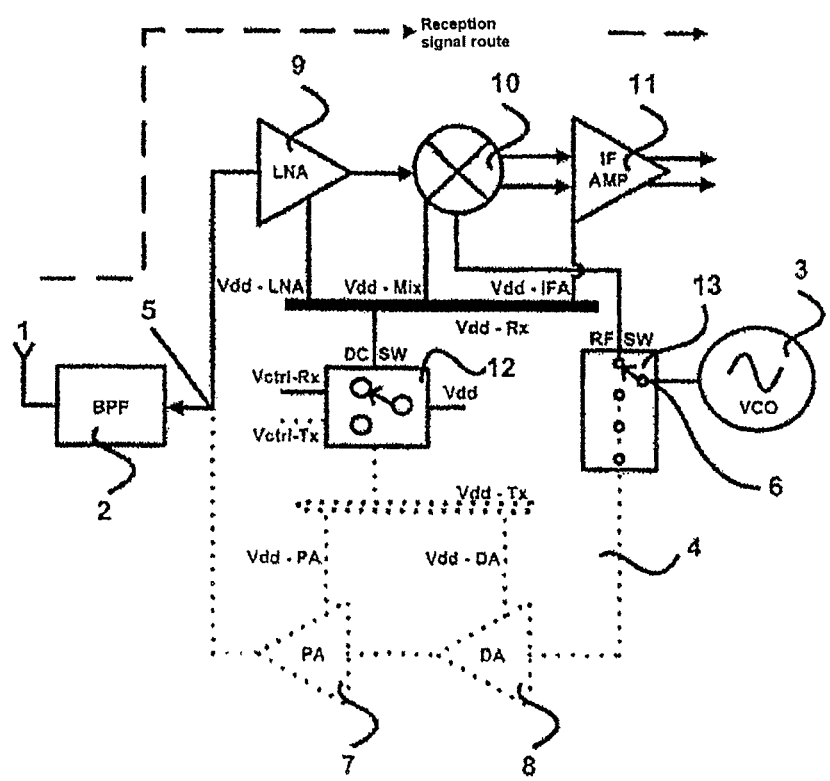
FIG. 4 shows a schematic representation of the FMCW radar transceiver from FIG. 1 in the reception mode of operation.

In what follows reference is made to FIGS. 3 and 4.

In the transmission mode of operation the RF switch 13 delivers the signals of the voltage-controlled oscillator 3 to the transmitter (that is to say, to the input of the driver amplifier 8), in that the transmission control terminal Vctrl-Tx is switched in, whereas the receiver circuit part is switched out, in that the receiver control terminal Vctrl-Rx is switched out. FIG. 3 shows the arrangement from FIG. 1 in the transmission mode of operation in which a transmission-reception route is formed. Losses that arise by virtue of the multi-stage switching network along the transmission signal route are compensated for by means of the driver amplifier 8. The driver amplifier 8 provides the necessary amplification and drives the power amplifier 7 to a desired level of signal, which leads to the desired output power level. In the transmission mode of operation the isolation obtained by virtue of the single-stage switching stages (M1/M2) of the switching network is available for the signals of the voltage-controlled oscillator 3 at the local oscillator (LO) input of the mixer 10. By virtue of this isolation the very low level of the signals of the voltage-controlled oscillator 3 at the LO input of the mixer 10 ensures that the mixer 10 is completely non-functional. In addition this completes the reception mode of operation.

By virtue of the synchronised switching in the active or passive mixer cases, the setting of the receiver out of operation is ensured by means of a signal level of the signals of the voltage-controlled oscillator 3 of less than −20 dBm at the LO input of the mixer 10. During the transmission mode of operation a high level of isolation is ensured by virtue of switching out all receiver circuit elements by means of the synchronised DC switch 12.

FIG. 4 shows the arrangement from FIG. 1 in the reception mode of operation. The RF switch 13, taking into account the signal path then formed in the RF switch 13, delivers the signals of the voltage-controlled oscillator 3 to the LO input of the mixer 10, while the driver amplifier 8 and the power amplifier 7 as parts of the transmitter are switched out, in that the transmission control terminal Vctrl-Tx is switched out. After processing the reception signal is provided at the end of the reception signal route at the output of the IF amplifier 11.

By virtue of the asymmetric RF switching network the LO input of the mixer 10 achieves a lower level of signal damping (as a consequence of the single-stage circuit), which secures the desired LO signal power level at the mixer 10.

The proposed technology also improves the LO signal isolation in the transmission region during reception. A high level of isolation of the signals of the voltage-controlled oscillator 3 at the input of the driver amplifier 8 is achieved by means of the cascaded isolation of the several switching stages along the transmission signal route. This is of importance for the continuous-wave operation of the voltage-control oscillator 3 in the transmission and reception modes of operation. The large signal that is generated by the voltage-controlled oscillator 3 after the high level of isolation by virtue of the RF switch 13, arrives at the input of the driver amplifier 8. The synchronised DC switch 12 switches out the power amplifier 7 and also the driver amplifier 8, in that the transmission control terminal Vctrl-Tx is switched out. As a consequence the signal on the transmission side is further damped. All this leads to a very high level of isolation of the signals of the voltage-controlled oscillator 3 at the transmitter. Stable and interference-free operation of the total front end is ensured.

In one configuration the input of the amplifier 9 and the output of the power amplifier 7 are matched at 50Ω. The inputs of the amplifier 9 and the power amplifier 7 are directly coupled at the signal terminal 5 (50Ω) via a single-chip network. By virtue of the 50Ω, the broadband matching of the input of the amplifier 9 and the output of the power amplifier 7 encounters a total deterioration of less than 1 dB in the reception mode of operation. In the reception mode of operation the amplifier 9 is switched in and the power amplifier 7 is switched out, while the power amplifier 7 continues to be connected with the signal terminal 5. In a similar manner an output power level deterioration of less than 1 dB is achieved in the transmission mode of operation, in which the power amplifier 7 is switched in and the amplifier 9 is switched out, although the latter continues to be connected with the signal terminal 5.

The circuit arrangement described for the front end can, for example, be implemented in terms of CMOS technology. For test purposes it was implemented in a 130 nm silicon chip.

The asymmetry provided for the RF switch, in the reception signal route on the one hand, and the transmission signal route on the other, leads to a number of advantages compared with the prior art. During reception low losses are ensured. The LO input of the mixer 10 guarantees a reliable mixing process and as a consequence a reliable reception mode of operation. During the reception mode of operation a high level of isolation of the transmission side is achieved at the same time. This is critical for the continuous-wave operation of the voltage-controlled oscillator 3. During the transmission mode of operation the driver amplifier 8 compensates for additional losses of the asymmetric circuit and drives the power amplifier 7 at the desired power level.

The DC switch 12 and the RF switch 13 are operated synchronously in time for purposes of the switchover. Together with the asymmetric isolation of the signals of the voltage-controlled oscillator 3 this ensures a high level of isolation for the various front end terminals. The low losses of the signals of the voltage-controlled oscillator 3 along the receiver route (in the reception mode of operation), and the loss compensation along the transmitter route (in the transmission mode of operation) by means of the driver amplifier 8, lead to a constant and high power level of the front end when in operation.

The technologies created with the invention can in their various forms of embodiment be deployed in a very wide range of applications. For example, applications can be cited in the automotive industry as well as any forms of wireless data transmission; these include, for example, positioning systems in industrial automation systems, or other sensor networks operating wirelessly. In general the technologies in high-frequency FMCW radar transceivers can be used. A single-chip implementation for the single antenna FMCW radar system forms a compact solution.

The proposed front end has been described above with the aid of examples of embodiment in conjunction with a voltage-controlled oscillator and a band-pass filter. For these devices that couple onto the front end any forms of implementation can be deployed in conjunction with the front end as proposed.

The features of the invention disclosed in the above description, the claims, and the drawing can be of importance, both individually and also in any combination for the implementation of the invention in its various forms of embodiment.

What is claimed is:

1. A FMCW radar transceiver, with:
  a single antenna,
  a signal filter device connected with the single antenna,
  a front end, which is formed with a circuit arrangement, connected with the signal filter device, and
  a voltage-controlled oscillator (VCO) device connected with the front end,
wherein the circuit arrangement includes:
  a signal terminal that connects the signal filter device to the front end,
  a further signal terminal that connects the VCO device with the front end, and
  an electronic circuit, that:
    is formed between the signal terminal and the further signal terminal, and
    with the aid of a switching device that has a pair of switches included in the electronic circuit a switchover between a reception circuit configuration and a transmission circuit configuration that differs from the reception circuit configuration is selectively enablable, such that, a signal received from the single antenna via the signal filter and the signal terminal in the reception circuit configuration, and a signal to be transmitted by the VCO device via the further signal terminal in the transmission circuit configuration and the single antenna, is processed in the electronic circuit, wherein
one of the switches of the switching device is an RF switch, in which a signal route formed respectively in the RF switch in the transmission circuit configuration on the one hand, and in the reception circuit configuration on the other, is embodied asymmetrically, in that the signal route in the reception circuit configuration and the signal route in the transmission circuit configuration have a differing number of switching stages.

2. The FMCW radar transceiver in accordance with claim 1, wherein the switching stages are embodied as single-stage and/or multi-stage switching stages.

3. The circuit arrangement according to claim 2, wherein the switching unit has a DC switch that is activated so as to form the reception signal route and the transmission signal route.

4. The circuit arrangement in accordance with claim 3, wherein the RF switch and the DC switch are coupled such that both switches switch in a synchronous manner during a switchover between the reception circuit configuration and the transmission circuit configuration.

5. The FMCW radar transceiver according to claim 1, wherein the switching unit has a DC switch that is activated so as to form the reception signal route and the transmission signal route.

6. The FMCW radar transceiver in accordance with claim 5, wherein the RF switch and the DC switch are coupled such that both switches switch in a synchronous manner during a switchover between the reception circuit configuration and the transmission circuit configuration.

7. The FMCW radar transceiver according to claim 1, wherein the signal filter device is formed with a band-pass filter.

8. The FMCW radar transceiver according to claim 1, wherein the signal route formed in the RF switch:
in the transmission circuit configuration includes a transmission signal route and is formed as part of a signal path from the further terminal to an amplifier device, and
in the reception circuit configuration is formed as part of a signal path from the further terminal to a mixer device, which is arranged in a reception signal route.

9. A method for the operation of a front end of an FMCW radar transceiver for a combined transmission/reception operation, wherein the FMCW radar transceiver has: a single antenna, a signal filter device connected with the single antenna, a front end, which is formed with a circuit arrangement, connected with the signal filter device via a signal terminal, and a voltage-controlled oscillator (VCO) device connected with the front end via a further signal terminal, and the method comprises:
switching over an electronic circuit between a reception circuit configuration and a transmission circuit configuration, the electronic circuit being formed in the circuit arrangement of the front end between the signal terminal and the further signal terminal, with the aid of a switching device having a pair of switches included in the electronic circuit, wherein
the switchover is executed with the aid of the switching device, such that, a signal received from the single antenna via the signal filter and the signal terminal in the reception circuit configuration, and a signal to be transmitted by the VCO device via the further signal terminal in the transmission circuit configuration and the single antenna, is processed in the electronic circuit, and
one of the switches of the switching device is an RF switch in which a signal route formed respectively in the RF switch in the transmission circuit configuration on the one hand, and in the reception circuit configuration on the other, is embodied asymmetrically, in that the signal route in the reception circuit configuration and the signal route in the transmission circuit configuration have a differing number of switching stages.

10. The method in accordance with claim 9, wherein during the switchover between the reception circuit configuration and the transmission circuit configuration a DC switch that is formed in the switching device is activated.

11. The method in accordance with claim 10, wherein during the switchover between the reception circuit configuration and the transmission circuit configuration the RF switch and the DC switch are switched in a time-wise synchronous manner.

12. The method in accordance with claim 11, wherein the signal route formed in the RF switch:
in the transmission circuit configuration includes a transmission signal route and is formed as part of a signal path from the further terminal to an amplifier device, and
in the reception circuit configuration is formed as part of a signal path from the further terminal to a mixer device, which is arranged in a reception signal route.

13. The method in accordance with claim 10, wherein the signal route formed in the RF switch:
in the transmission circuit configuration includes a transmission signal route and is formed as part of a signal path from the further terminal to an amplifier device, and
in the reception circuit configuration is formed as part of a signal path from the further terminal to a mixer device, which is arranged in a reception signal route.

14. The method in accordance with claim 9, wherein the signal route formed in the RF switch:
in the transmission circuit configuration includes a transmission signal route and is formed as part of a signal path from the further terminal to an amplifier device, and
in the reception circuit configuration is formed as part of a signal path from the further terminal to a mixer device, which is arranged in a reception signal route.

15. A circuit arrangement of a front end of an FMCW radar transceiver, with:
a signal terminal that is configured for purposes of coupling a signal exchange with a signal filter device,
a further signal terminal that is configured for purposes of coupling a signal exchange with a VCO device, and
an electronic circuit, that:
is formed between the signal terminal and the further signal terminal, and
with the aid of a switching device included in the electronic circuit a switch-over can be made between a reception circuit configuration and a transmission circuit configuration that differs from the reception circuit configuration, such that, a signal received via the signal terminal in the reception circuit configuration, and a signal to be transmitted via a further signal terminal in the transmission circuit configuration, can be received and processed in the electronic circuit, wherein:

the switching device has:
- a DC switch that is activated so as to form the reception signal route and the transmission signal route, and
- an RF switch, in which a signal route formed respectively in the RF switch in the transmission circuit configuration on the one hand, and in the reception circuit configuration on the other, is embodied asymmetrically, in that the signal route in the reception circuit configuration and the signal route in the transmission circuit configuration have a differing number of switching stages, and
- the RF switch and the DC switch are coupled such that both switches switch in a synchronous manner during a switchover between the reception circuit configuration and the transmission circuit configuration.

16. The circuit arrangement in accordance with claim 15, wherein the switching stages are embodied as single-stage and/or multi-stage switching stages.

17. The circuit arrangement-according to claim 15, wherein the signal filter device is formed with a band-pass filter.

18. The circuit arrangement-according to claim 15, wherein the signal route formed in the RF switch:
- in the transmission circuit configuration includes a transmission signal route and is formed as part of a signal path from the further terminal to an amplifier device, and
- in the reception circuit configuration is formed as part of a signal path from the further terminal to a mixer device, which is arranged in a reception signal route.

* * * * *